United States Patent [19]

Lessard

[11] Patent Number: 4,773,455
[45] Date of Patent: Sep. 27, 1988

[54] TREE DELIMBER EQUIPPED WITH AN ARTICULATED BOOM

[75] Inventor: Michel Lessard, Hebertville, Canada

[73] Assignee: Less-Micanik Inc., Hebertville, Canada

[21] Appl. No.: 110,428

[22] Filed: Oct. 20, 1987

[51] Int. Cl.[4] .................. A01G 23/02; B27L 1/00
[52] U.S. Cl. .................... 144/2 Z; 414/718; 212/266
[58] Field of Search ............ 254/166, 173, 189, 175.3; 191/12 R; 414/338, 343, 686, 718; 212/144, 266, 183; 144/2 Z, 343

[56] References Cited

U.S. PATENT DOCUMENTS

| 4,276,918 | 7/1981 | Sigouin | 144/2 Z |
| 4,291,734 | 9/1981 | Hammond | 144/2 Z |
| 4,350,189 | 9/1982 | Duchesne | 144/2 Z |
| 4,413,661 | 11/1983 | Marchildon | 144/2 Z |
| 4,428,407 | 1/1984 | Bourbeau | 144/2 Z |
| 4,582,104 | 4/1986 | Sigouin | 144/2 Z |

FOREIGN PATENT DOCUMENTS

1055366 5/1979 Canada.
1142062 3/1983 Canada.

*Primary Examiner*—W. Donald Bray
*Attorney, Agent, or Firm*—Robic, Robic & Associates

[57] ABSTRACT

An improved boom construction having a base, a first straight boom slidably mounted on the base, and a second, hinged boom pivotally mounted at one end to the base and at its other end to the front end of the first boom. Power jacks are provided for operating the second boom to move its other end toward or away from its one end so as to slide the first boom relative to the base. The improved boom construction is preferably employed on a tree delimber with a tree delimbing unit mounted on the front end of the first boom, and tree gripping unit mounted on the base beneath the first boom. A rotating reel is advantageously provided on the base above the first boom for simultaneously winding and unwinding flexible feed and return hydraulic lines extending over the top of the boom, and connected to the delimbing unit, as the first boom slides.

16 Claims, 11 Drawing Sheets

TREE DELIMBER EQUIPPED WITH AN ARTICULATED BOOM

BACKGROUND OF THE INVENTION (a) Field of the invention

The present invention relates to an improved boom construction and to an improved tree delimbing unit incorporating such an improved boom construction.

The invention also relates to an improved hydraulic circuit assembly for use in boom construction and to an improved tree delimbing unit incorporating such an improved hydraulic circuit.

(b) Brief description of the prior art

Several types of boom constructions are well known, particularly but not exclusively, in the tree delimbing art.

A first known type of boom construction is disclosed, by way of example, in Canadian Pat. No. 1,142,062 to Jean Pelletier et al. Such a boom construction employs a hinged or knuckle boom made in two sections which are pivotally connected together, usually at adjacent ends. One end of this boom is pivotally connected to a base. Work handling means, such as tree delimbing means for example, are mounted on the other end of the boom. Hydraulic actuators are pivotally connected between the sections and hydraulic actuators are also connected between the boom and the base. Operation of the actuators hinges or unhinges the boom to move the work handling means toward or away from the base. When the hinged boom is used in a tree delimber, the work handling means at the end of the boom comprise delimbing means. Tree gripping means are provided on the base for gripping the butt end of a tree to be delimbed. To delimb a tree, the tree is first grasped by the delimbing means and the boom is manevvered to place the butt end of the tree in the gripping means. While the tree is gripped, the boom is then maneuvered to move the delimbing means along the tree to delimb it. An operator using a delimber with a hinged boom has a problem however in trying to place the butt end of a tree into the gripping means on the base. It takes a great deal of experience to properly operate the hinged boom actuating means to load the tree into the gripping means and even then the delimbing operation is slow.

Another type of boom construction known in the art is disclosed, by way of example, in Canadian Pat. No. 1,055,366 to Roger Sigouin. This other boom construction employs a straight, rigid boom that is mounted through a base. Work handling means are provided at the outer end of the boom and means are provided for sliding the boom through the base to move the work handling means toward or away from the base. When this boom is used in a tree delimber, tree delimbing means are mounted on the end of the boom and tree gripping means are mounted on the base. The delimbing operation is the same as that used with a knuckle boom except that the rigid boom slides through the base to move the work handling means. However because the boom slides through the base, it is quite easy to place the butt end of a tree to be delimbed in the gripping means on the base since the delimbing means on the boom are positioned to be aligned with the gripping means. The disadvantage of such a straight, sliding boom lies however in its moving means which usually comprises a set of chains on the boom with gears or sprockets mounted on the base. Rotation of the sprockets slides the boom relative to the base via the chains. The sprockets and chains often break however and require frequent replacement and/or maintenance thereby slowing production.

Another disadvantage of the boom constructions employing a straight, rigid, sliding boom lies in the handling of the hydraulic lines which feed and return hydraulic fluid to the work handling means located at the end of the boom. The lines carry hydraulic fluid from a supply means on the base and since the distance between the work handling means and base varies depending on the position of the boom, means must be provided to take up the slack in the lines as the work handling means moves toward the base. One common known system for handling the lines involves suspending the lines from pulleys running on support cables above the boom. As the boom moves the work handling means toward the base, the pulleys bunch together with the lines they hold looping down between adjacent pulleys. The support cables are high enough to accomodate the loops. However, the cables and loops are quite open and exposed and often suffer damage during operation, particularly when used on delimbers.

SUMMARY OF THE INVENTION

An object of the present invention is to provide an improved boom construction that provides more control over positioning of the work handling means at the end of the boom, relative to a work station, while at the same time providing boom moving means that are more reliable in operation.

Another object of the present invention is to provide a tree delimbing unit which incorporates such an improved boom construction.

A further object of the present invention is to provide an improved hydraulic circuit assembly for a sliding boom construction, which assembly locates the hydraulic lines close to the boom where they are protected and normally out of the way, and also maintains the lines taut no matter what the relative position of the sliding boom to the base.

Still another object of the present invention is to provide a tree delimbing unit which incorporates both the improved boom construction and the improved hydraulic circuit assembly.

The improved boom construction according to the present invention, advantageously combines a sliding boom with a hinged boom. The sliding boom is slidably mounted in a base and carries work handling means at its outer end. The hinged boom is pivotally mounted at one end to the base and at its other end to the outer end of the sliding boom. Hydraulic actuators on the hinged boom are operated to move the hinged boom thereby moving the sliding boom relative to the base. The sliding boom properly and easily positions the work handling means thereon relative to a work station on the base. The hydraulically actuated hinged boom reliably moves the sliding boom. Such a construction employs two combined booms as compared to the one boom normally used; however, the two booms used are much lighter in weight than a single boom since they are combined and together do not add up to a great increase in weight over a single boom.

When the improved boom construction according to the invention is used on a tree delimber, tree delimbing means are provided at the outer end of the sliding boom and tree gripping means are provided on the base just under the sliding boom. The hinged boom is actuated to move the sliding boom in order to position the delimbing means adjacent the gripping means so that a tree to be delimbed is easily loaded.

The improved hydraulic circuit assembly according to the present invention can be used either with a standard boom or with the improved boom construction according to the invention. This hydraulic circuit assembly has at least one freely rotatable reel mounted on the base above the sliding boom. Flexible hydraulic lines are wound on the reel and extend in either direction from the reel along the top of the boom, just above it, to connect to the ends of the boom. From the ends of the boom, connections are made to the work handling means at the end of the boom. At the reel, the lines connect to a source of hydraulic fluid on the base. As the boom is moved in one direction or the other, the reel rotates in one direction or the other, thus winding or unwinding one line, and simultaneously unwindng or winding the other line as the case may be. In all cases, both lines are maintained taut.

As aforesaid, while the hydraulic circuit assembly according to the invention is specifically designed for use with the improved boom construction of the present invention, it can also be used with any type of boom construction employing a sliding boom.

The invention as broadly claimed hereinafter is specifically directed toward a boom construction comprising:

a base;

a first, straight boom mounted on the base, this bloom having a front end and a rear end;

guiding means on the base for guiding the first boom for sliding movement relative to the base;

a second, hinged boom having a pair of ends;

means for pivotally mounting the second boom at one end to the base and at the other end to the front end of the first boom; and means for operating the second boom to move its other end toward or away from its one end so as to slide the first boom relative to the base.

The invention as broadly claimed is also specifically directed toward a tree delimbing unit comprising:

a base;

a first, straight boom mounted on the base, this boom having a front end and a rear end;

guide means for guiding the first boom for sliding movement relative to the base;

a second hinged boom having a pair of ends;

means for pivotally mounting the second boom at one end to the base, and at the other end to the front end of the first boom;

means for operating the second boom to move its other end toward or away from its one end so as to slide the first boom relative to the base;

means on the base beneath the first boom for gripping a tree to be delimbed; and delimbing means mounted on the front end of first boom for delimbing a tree held by the gripping means when the first boom is slidably moved by the second boom.

The invention as broadly claimed is further directed toward a hydraulic circuit assembly for a boom construction having a straight rigid boom, a base, means for guiding the boom for movement through the base, and means for moving the boom relative to the base. The circuit assembly comprises:

a hydraulic fluid supply on the base;
hydraulically operated means on the boom;
a line handling station on the base;
a first flexible line extending along the boom in one direction from the handling station;
a second flexible line extending along the boom in an opposite direction to the one direction from the handling station;
means connecting the first and second lines to the hydraulically operated means on the boom;
means connecting the handling station to the fluid supply;
the handling station having rotatable means for maintaining the first and second lines taut as the boom moves relative to the base.

BRIEF DESCRIPTION OF THE DRAWINGS

The invention and its advantages will be better understood upon reading the following, nonrestrictive description of a preferred embodiment thereof, having reference to the accompanying drawings in which:

FIGS. 11, 12 and 13, are side views of the delimbing unit in various stages of operation;

DESCRIPTION OF A PREFERRED EMBODIMENT

Figure 1:
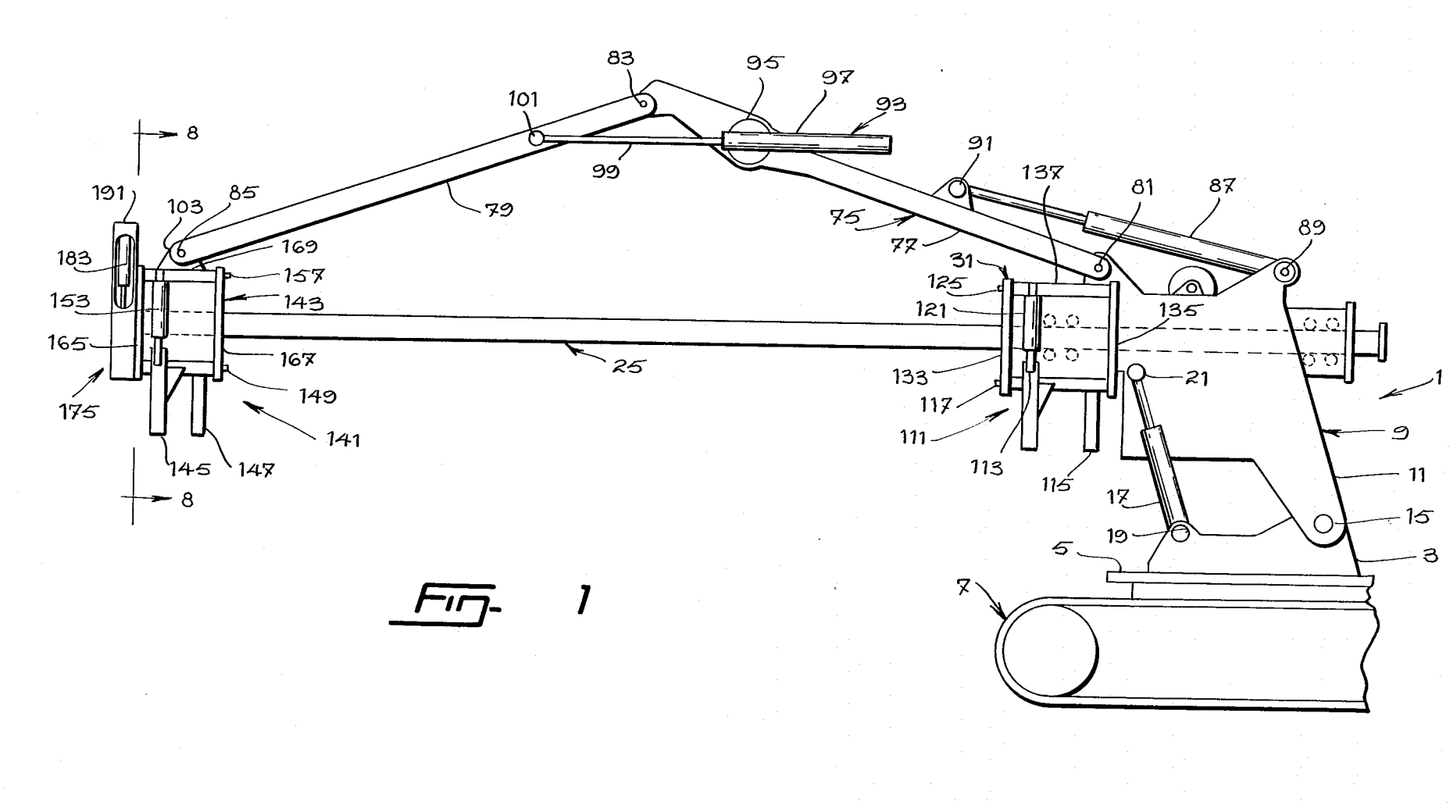
FIG. 1 is a side elevational view of a tree delimbing unit according to the invention.

The tree delimbing unit 1 according to the invention as shown in FIG. 1, comprises a platform 3 that is adapted to be fixed onto the platform 5 of a tracked vehicle 7. The platform 5 is rotatable about a vertical axis and rotates the delimbing unit 1 with it.

The delimbing unit 1 also comprises a base 9 provided with downwardly extending mounting legs 11 at its rear end. The legs 11 straddle a mounting ear 13 projecting up from the rear of the platform 3. A horizontal pin 15 pivotally connects the legs 11 to the ear 13. A pair of hydraulic actuators 17 are pivotally mounted with pins 19 at their lower ends to the front of the platform 3. The actuators 17 extend upwardly along the sides of the base 9 and are pivotally connected to the base at its front end by pins 21. Operation of the actuators 17 will tilt the base 9, relative to the platform 3, about the horizontal pin 15.

While the tree delimbing unit 1 has been described as including a platform 3, the platform 3 could also form part of the vehicle 7 which, of course, may carry an operator's cab (not shown) with appropriate controls therein for controlling operation of both the vehicle and the delimbing unit.

Figure 2:
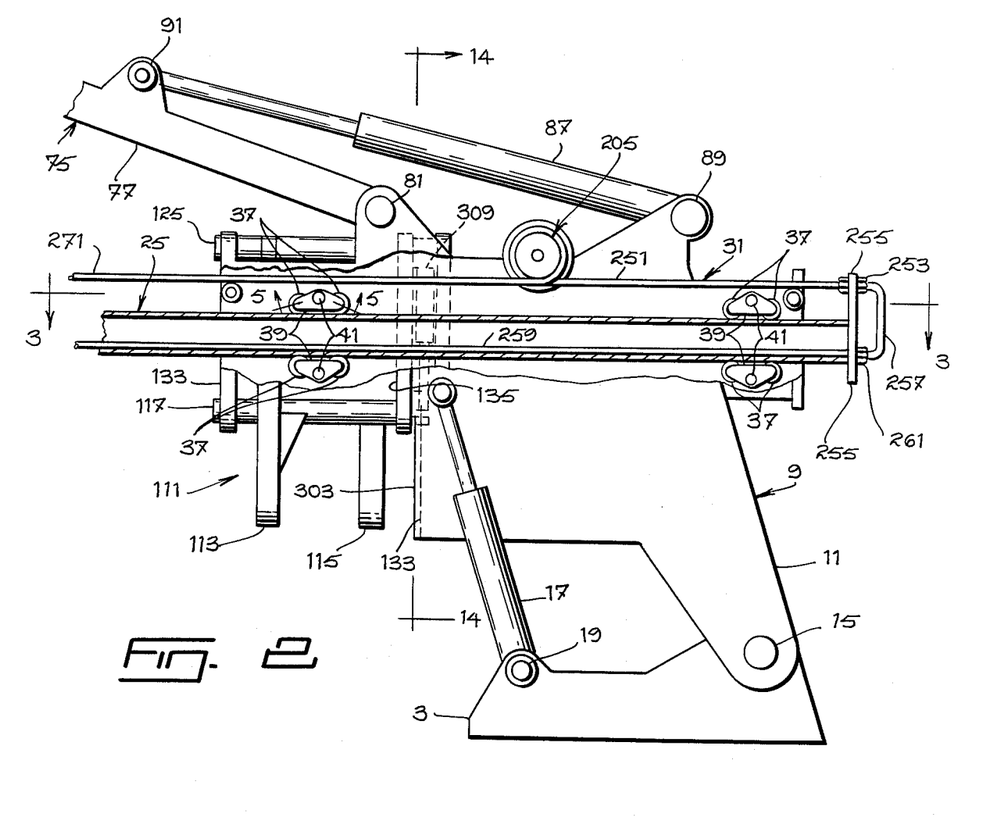
FIG. 2 is a detailed, cross-sectional view showing the mounting of the first, sliding boom of the delimbing unit of FIG. 1 onto its base.
Figure 3:
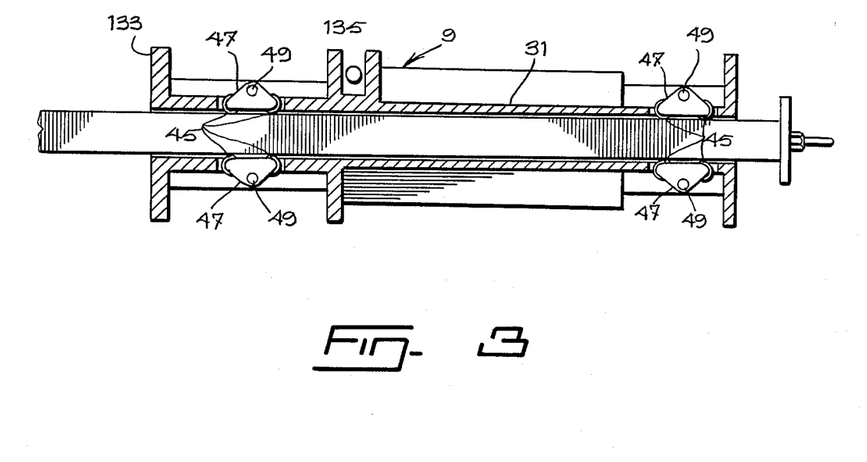
FIG. 3 is a cross-sectional view taken along line 3—3 of FIG. 2.
Figures 4, 5:
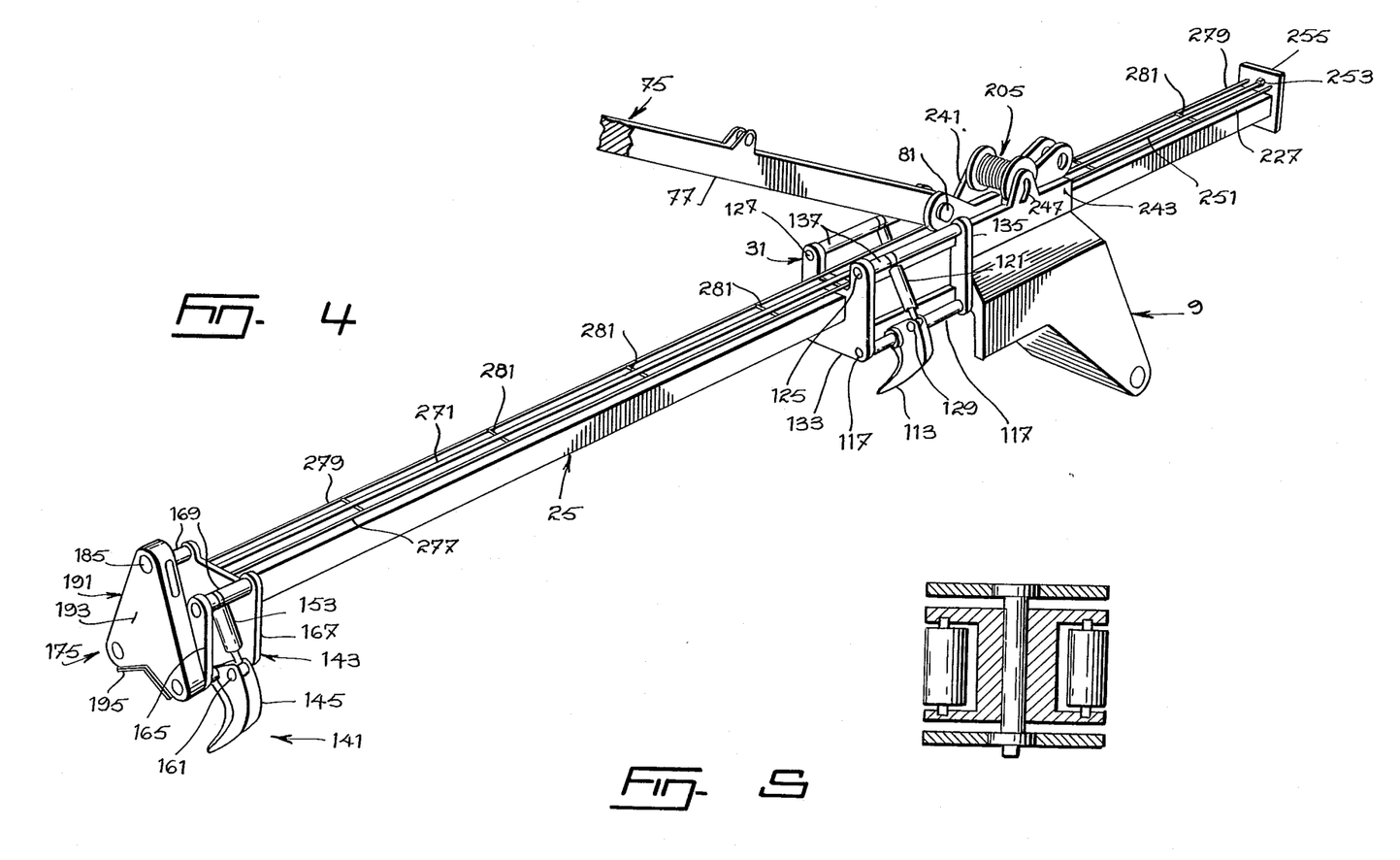
FIG. 4 is a perspective view of the first boom of the delimbing unit.
FIG. 5 appearing on the same sheet as FIG. 2, is a detail cross-sectional of the sliding boom guide means taken along line 5—5 in FIG. 2.

The delimbing unit 1 further comprises a first, sliding boom 25 as shown in FIGS. 2 to 4, that is mounted on the base 9. The sliding boom 25 is a straight, rigid member of generally rectangular cross-sectional shape, which is mounted for sliding movement through a forwardly extending frame 31 fixed onto the top of the base 9 and defining a passageway 27 for the boom.

Guide means are provided on the base 9 for guiding the sliding boom 25 for sliding movement relative to the base. The guide means include horizontal cylindrical rollers 37 provided at each end of the frame 31 for guiding the boom 25, as shown in FIG. 2. The rollers 37 are arranged in pairs above and under the boom 25 near each end of frame 31. A holding frame 39 carries each pair of rollers 37. Each holding frame 39 is mounted by a horizontal pivot pin 41 to the base frame 31. The mounting pin 41 allows the holding frame 39 to pivot slightly thereby allowing the pair of rollers 37 that it carries to find their best position on the boom 25.

Vertical cylindrical rollers 45 are also provided at each end of the base frame 31 for guiding the boom 25 as shown in FIG. 3. The vertical rollers 45 are arranged in pairs on both sides of the boom 25 near each end of base frame 31. A holding frame 47 carries each pair of rollers 45 in parallel, slightly spaced apart relationship. Each holding frame 47 is mounted by a vertical pivot pin 49 to the frame 29. The mounting pin 49 allows the holding frame 47 to freely pivot about a vertical axis thereby allowing the pair of rollers 45 that it carries to find their best position on the boom 25.

Preferably, means are pivoted to adjustably mount the holding frames 39, 47 on the base frame 31 so that the roller pairs 37, 45 can be closely located to the boom 25 in order to firmly guide it. The adjusting means are the same for both holding frames 39, 47 so only the adjusting means for the holding frames 39 will be described. These adjusting means comprise a pair of eccentric rings 53 mounted at both ends of the pivot 41 of the holding frame 39 as shown in FIG. 5. The rings 53 are rotatably mounted in cylindrical bores 55 provided in the base frame 31. Rotation of the pivot 41 and rings 53 in the bores 55 of base frame 31 by means of a key 57 intefral to one of the ring will adjust the position of rollers 37 relative to the boom 25.

The rollers 37 and 45 guide the sliding boom 25 for sliding movement relative to the base 9 through the passageway 29 defined in the frame 31.

Means are provided for moving the sliding boom 25 relative to the base 9. These moving means comprise a second, hinged boom 75 as shown in FIG. 1. The hinged boom 75 has an inner section 77 and an outer section 79. One end of the inner boom section 77 is connected to the top of the base 9 with a horizontal pivot pin 81. The other end of the inner boom section 77 is connected to one end of the outer boom section 79 with a horizontal pivot pin 83. The other end of the outer boom section 79 is connected to the outer end of the first boom 25 by a horizontal pivot pin 85.

A first hydraulic actuator 87 is connected at one end to the base 9, behind the pivot pin 81, with a pivot pin 89. The other end of the actuator 85 is connected to the inner boom section 77, at a point spaced outwardly from the pivot pin 81, by a pivot pin 91. A pair of hydraulic actuators 93 operably connect the inner and outer boom sections 77 and 79 together. Each actuator 93 is mounted to one side of the inner boom section 77 by a pivot pin 95. The actuator 93 is fixed via its outer casing 97 to pin 95. The pin 95 is spaced rearwardly a short distance from the pivot pin 83, connecting the boom sections 77 and 79 together. The movable member 99 of the actuators 93 is connected at its outer end to the sides of the outer boom section 79 by pivot pins 101. The pins 101 are located a short distance forwardly from the pivot pin 83.

Operation of the actuators 87 and 93 will move the outer end 103 of the outer boom section 79 toward or away from the base 9. The actuators 87 and 93 are operated in a manner to move the outer end 103 of the outer boom section 79 in a relatively straight line toward or away from the base 9. This movement causes the sliding boom 25, connected at its outer end to the hinged boom 75 via the pivot pin 85, to slide forwards and backwards relative to the base 9. Thus the operation of the hinged boom 75 controls the movement of the sliding boom 25.

Figure 6:
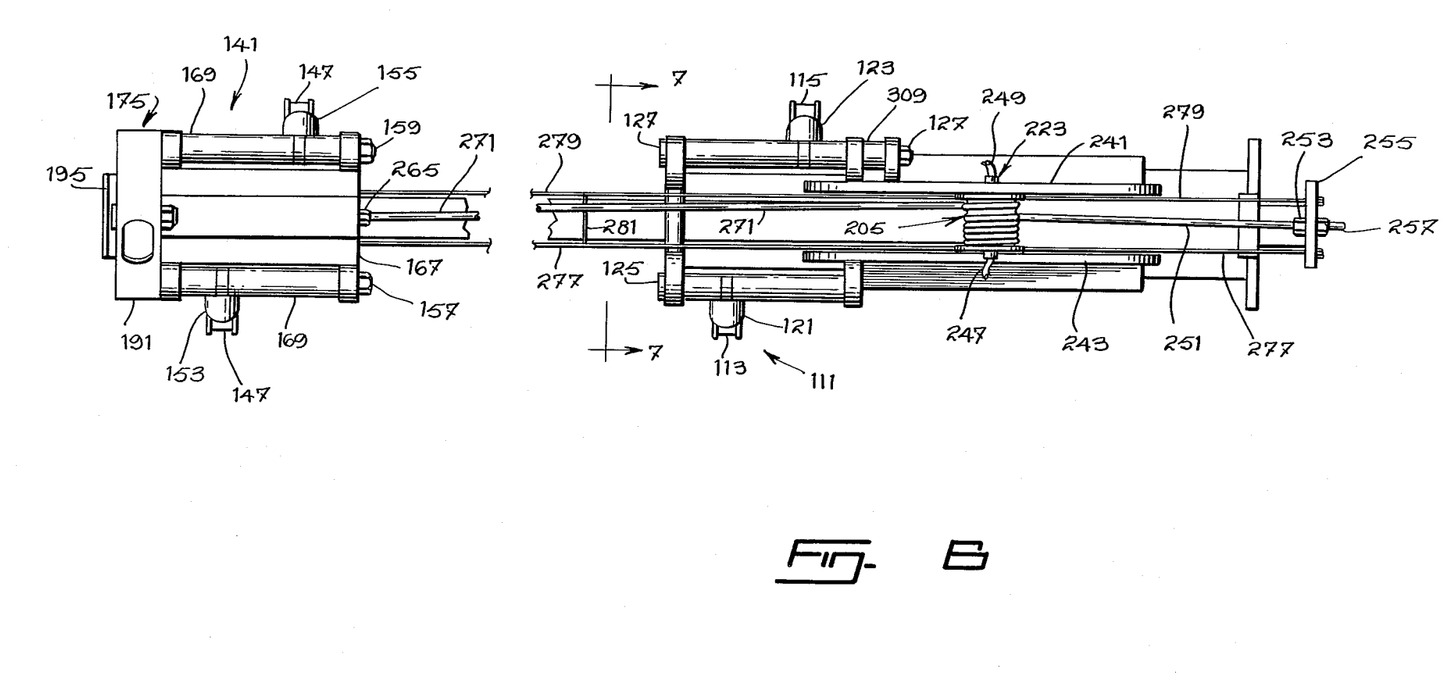
FIG. 6 is a top view of the sliding boom of the delimbing unit.
Figure 7:
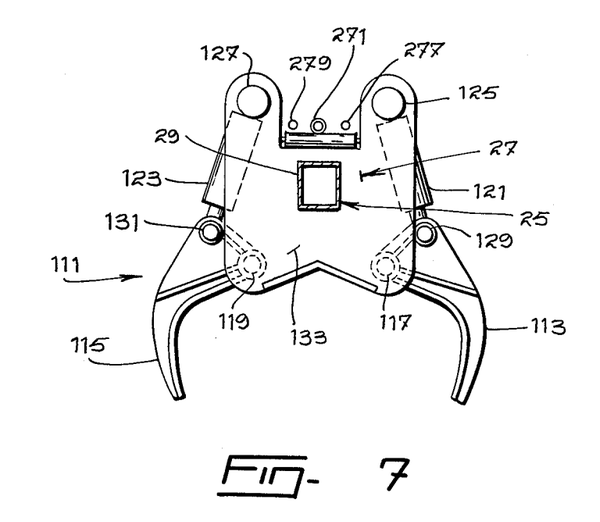
FIG. 7 is a cross-section view taken along line 7—7 in FIG. 6.

Means are provided on the base 9 to grip the butt end of a tree to be delimbed. These gripping means 11, as shown in FIGS. 2, 6 and 7, comprise a pair of jaws 113 and 115 mounted on the base 9 and projecting down below the sliding boom 25. Each jaw 113, 115 is mounted at one end on a lower pivot rod 117 and 119, respectively. The rods 117, 119 are mounted one on each side of the base extension 27 and are located at the bottom of the base extension 27. A hydraulic actuator 121, 123 is provided for each jaw 113, 115. One end of actuators 121, 123 is pivotally mounted on upper pivot rods 125 and 127, respectively. The pivot rods 125 and 127 are mounted one on each side of the base extension 27 and are located at the top of the base extension 27 extending over the pivot rods 117 and 119, respectively, and parallel to them. The actuators 121 and 123 extend downwardly and slightly outwardly and are mounted to the gripping jaws 113 and 115 with pivot pins 129 and 131 that are located slightly above and outwardly of the lower pivot rods 117 and 119, respectively. In greater detail, the lower and upper pivot rods 117, 119 and 125, 127 extend between two end plates 133 and 135 forming part of the base frame 31. Sleeves 137 can be mounted over the upper pivot rods 125 and 127 between the actuators 121 and 123 and the end plates 133 and 135 to lock the actuators 121 and 123 against lateral movement along the rods 117 and 119. The jaws 113 and 115 and their actuators 121 and 123 are offset longitudinally with respect to each other to avoid interference. The amount of offset can be varied if desired by using a different set of sleeves 137. Operation of actuators 121 and 123 will pivot the jaws 113 and 115 toward each other about the lower pivot rods 117 and 119 to grasp a tree butt end between them under the base extension 27.

Preferably, a butt surface 113, as shown in FIG. 2, is provided on the front portion of the base 9 under the base frame 31. The butt surface 133 is located just behind the gripping means 111 and the butt end of a tree to be delimbed is positioned against the butt surface 133 to locate the tree for delimbing.

Figure 8:
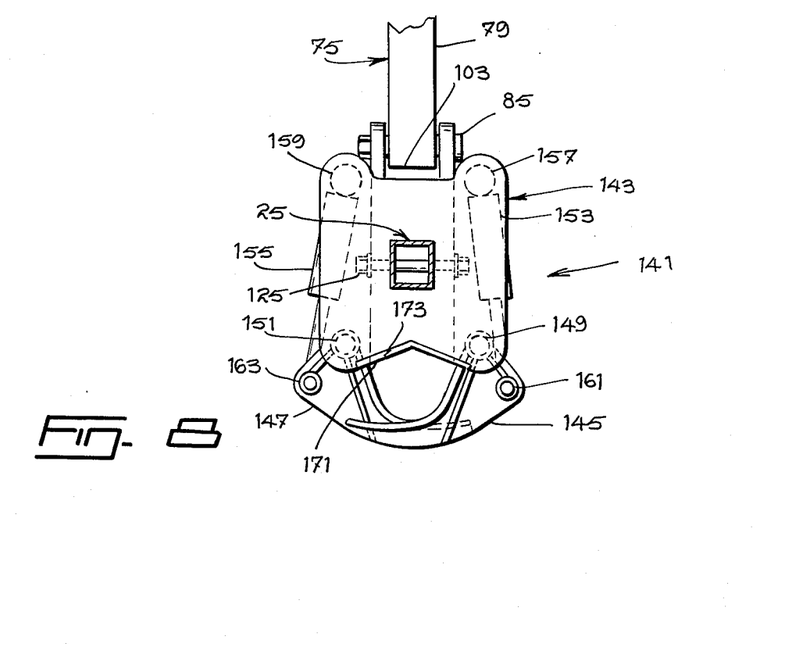
FIG. 8 is a cross-section view taken along line 8—8 in FIG. 1.

Means are provided on the front end of the sliding boom 25 to delimb a tree held by the gripping means 111. The delimbing means 141, as shown in FIGS. 1, 4 and 8, is quite similar in construction to the gripping means 111 and has a frame 143 mounted on the front end of the sliding boom 25. A bolt 144 connects the frame 143 to the boom 25. The frame 143 carries a pair of longitudinally spaced-apart, curved delimbing arms 145 and 147, one on each side of the frame 143. Each arm 145 and 147 is pivotally mounted on a lower pivot rod 149 and 151, respectively. The pivot rods 149 and 151 are mounted one on each side of the frame 143 near its bottom, and extend generally horizontally. A hydraulic actuator 153 and 155 is provided for each delimbing arm 145 and 147. The actuators 153 and 155 are pivotally mounted at one end to upper pivot rods 157 and 159, respectively. The pivot rods 157 and 159 are mounted on the frame 143, one at each side, near its top. The upper pivot rods 157 and 159 overlie the lower pivot rods 149 and 151, respectively, and are generally parallel to them. The other ends of the actuators 153 and 155 are pivotally mounted on the delimbing arms 145 and 147 by pivot pins 161 and 163 respectively. The pivot pins 161 and 163 are located outwardly of the lower pivot rods 149 and 151. In greater detail, as shown in FIG. 1, the lower and upper pivot rods 149, 151 and 157, 159 extend between two end plates 165 and 167 forming part of the frame 143. Sleeves 169 can be mounted on the upper pivot rods 157 and 159 to prevent lateral movement of the actuators 153 and 155. Operation of the actuators 153 and 155 will pivot the delimbing arms 145 and 147 about the lower pivot rods 149 and 151 to partly encircle a tree trunk to be delimbed as shown in FIG. 8.

The delimbing means 141 includes a delimbing plate 171 fixed to the bottom of the frame 143 as shown in FIG. 8. The plate 171 is bent to open downwardly at a wide angle and has a sharpened, front delimbing edge 173. The plate 171 and the delimbing arms 145, 147 combine to delimb a tree as will be described.

Figure 9:
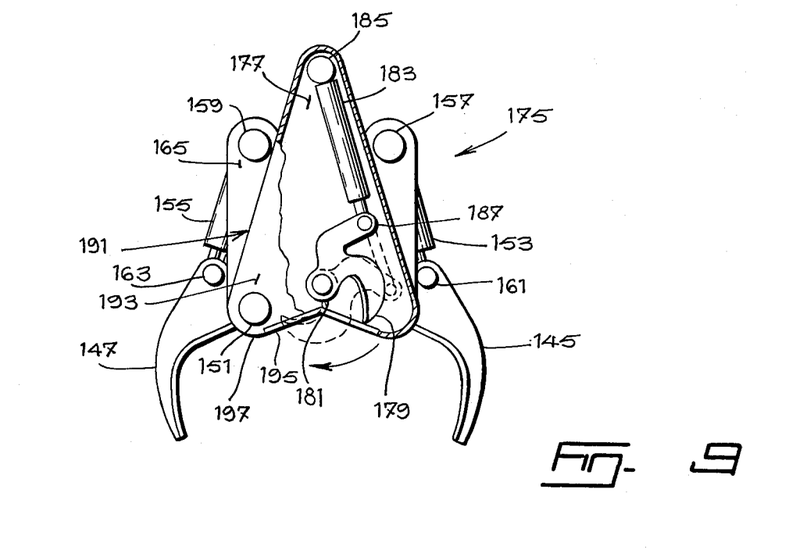
FIG. 9 is a front view of the delimbing unit, in partial cross-section.

Means are provided adjacent the delimbing means 141 for cutting off the top of a delimbed tree. The cut-off means 175, as shown in FIGS. 1 and 9, can comprise a mounting plate 177 fixed in a vertical position on the front end plate 165 of the gripping means frame 145. A cutting knife 179 is pivotally mounted on the plate 177 by a pivot pin 181. The pivot pin 181 extends longitudinally into the gripping frame 145 and is located centrally near the bottom of the mounting plate 177. A hydraulic actuator 183 operates the cutting knife 179. The actuator 183 is rotatably mounted at one end to a pivot pin 185 mounted centrally at the top of the mounting plate 177. The other end of the actuator 183 is mounted with a pivot pin 187 to a crank arm 189 on the knife 179. Operation of the actuator 183 will cause the crank arm 189 to pivot the knife 179 about its pivot 181 to cut off the top of a tree being delimbed. The delimbing arms 145 and 147 hold the tree against the delimbing plate 167 while the knife 179 cuts off the tree top. A housing 191, open at the bottom, and mounted on the mounting plate 177, can enclose the actuator 183 and knife 179 when in its inoperative position to protect them. If desired, the housing 191 can extend down to the delimbing plate 167 and have the bottom of its front wall 193 shaped to conform with the profile of the delimbing plate 167. A narrow delimbing blade 195 can be attached to the front wall 193 of the housing 191 adjacent its bottom edge 197 to replace the delimbing edge 169 in the plate 167.

An improved hydraulic circuit is provided for supplying hydraulic fluid to the delimbing and cut-off actuators 153, 155 and 183 on the sliding boom 25. As shown in FIGS. 2, 4, 6 and 10, a reel 205 is rotatably mounted on the frame 31 of the base 9, just above the sliding boom 25. The reel 205 has a cylindrical mounting surface 207 that has a helical groove 209 therein. A restraining flange 211, 213 is provided at each end of the mounting surface 207. The reel 205 has a hollow, axial bore 215. A radial bore 217, 219 connects each end of the axial bore 215 to the mounting surface 207 adjacent the flanges 211 and 213, respectively.

Figure 10:
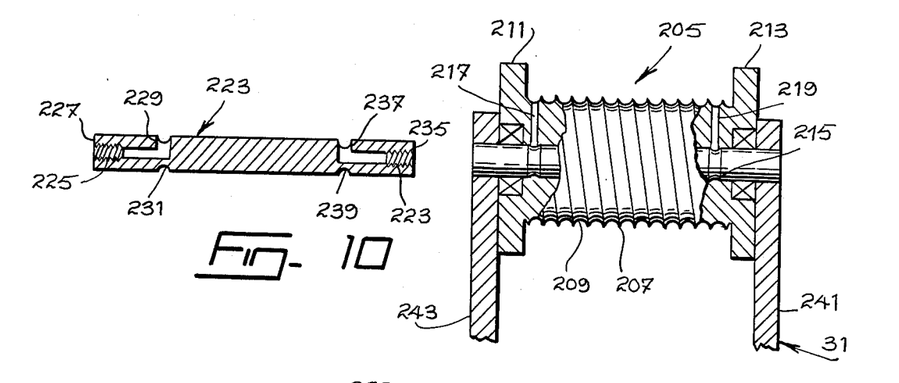
FIG. 10 is an exploded view, in partial crosssection, of a detail of the hydraulic circuit assembly used in the delimbing unit.

A spool 223 is provided for rotatably mounting the reel 205 onto the frame 31. The spool 223 extends snugly through the axial bore 215. The spool 223 has an inlet hole 225 extending axially inwardly from one end 227 of the spool. The inlet hole 225 ends in a radially extending section 229 that leads to a groove 231 encircling the spool 223. The spool 223 also has an outlet hole 223 extending axially inwardly from the other end 235 of the spool. The outlet hole 223 also ends in a radially extending section 237 that leads to a groove 239 encircling the spool.

The spool 223 is fixedly mounted on the frame 31 of the base 9, rearwardly of its first end and just above the sliding boom 25. The spool 223 extends transversely of the boom 25 and is fixedly mounted at its ends in the side walls 241 and 243 of the frame 31. The reel 205 is rotatably mounted on the spool 223, with the radial bores 217, 219 in the sleeve aligned with the cylindrical grooves 231, 239 respectively on the spool 223. Suitable seals (not shown) are provided between the rotating reel and fixed spool to prevent leakage.

An inlet line 247 for hydraulic fluid leads from a supply of hydraulic fluid 248 to the inlet bore 225 of the spool 233 and a return line 249 for hydraulic fluid leads to the supply from the outlet bore 233. A first flexible feed line 251 for hydraulic fluid is connected to the radial inlet bore 217 on reel 205. The flexible feed line 251 is wound several turns about the reel 205 in the helical groove 209 and then leaves the reel 205 at its bottom. The feed line 251 extends to the back of the boom to connect to a fitting 253. The fitting 253 is mounted in a back plate 255 which plate is mounted on the rear end of the sliding boom 25. A rigid feed connector 257 connects the flexible feed line 251, via the fitting 253, to another section of feed line 259 running through the boom 25, via a second fitting 261 in the back plate 255. The feed line section 259 running through the boom 25 can be rigid or flexible and is connected at its front end to the end plate 163 of frame 143 on the front end of the boom 25 via a fitting (not shown). From this fitting, connections are made to the hydraulic actuators 153, 155 and 183. Return lines from the actuators lead to another fitting 265 in the end plate 163 of the frame 143. From this fitting 265, a flexible return line 271 runs above the boom 25 to the reel 205. The return line 271 is wound several times on the reel 205 from the bottom in the helical groove 209. The line 271 is located on the other side of the reel 205 from the side the feed line 251 is wound on. The end of the return line 271 connects to the radial outlet bore 219 in the reel 205.

It can be seen that a closed circuit for hydraulic fluid is provided between the hydraulic supply source and the actuators 153, 155 and 183. The fluid flows from the supply source 248 through the line 247 to the inlet hole 225 in the spool 223, to the reel 205 via the bore 217 and to the line 251 on the reel. From the line 251, fluid flows through the connecting line 257 and line section 259 in the boom to the actuators 153, 155 and 183. From the actuators, fluid returns via the line 271, the reel 205, the bore 219, the spool 223, outlet hole 233, and the return line 249. It can also be understood that fluid can be made to flow in either direction by means of a valve 250 in the closed circuit depending on how the actuators are to be actuated. The terms "inlet", "feed", "outlet" and "return" as used in the above description, are to describe flow in one direction only, and the fittings and lines would have opposite terminology when the fluid is flowing in the other direction. It can also be understood that suitable control means (not shown) can be provided to control fluid flow to and from the cut-off actuator 183 independently of fluid flow to or from the delimbing arm actuators 153 and 155.

Means are provided for supporting both flexible feed and return lines 251 and 271 just above the boom 25 out of the way. These support means 275, as shown in FIGS. 4 and 6, preferably comprise a pair of tension cables 277 and 279 extending between the back plate 255 and the rear end plate 167 of the frame 143. The tension cables 277, 279 are located just above the top guide rollers 37 in the base frame 31, just below the reel 205, and of course just above the boom 25. Cross-supports 281 extend between the tension cables 277 and 279, longitudinally spaced-apart, and together with the cables form a support cradle. The flexible feed and return lines 251 and 271 are supported on the cross-supports 281 of the support cradle out of the way.

As the sliding boom 25 is moved back and forth through the base 9 during use, the flexible feed and return lines 251 and 271, each alternatively wind and unwind off the rotatable reel 205 fixed to the frame 31, so that there never is any slack in the lines. Thus, for example, as the sliding boom 25 moves forward relative to the base 9, the frame 143, on the front of the boom, connected to the return line 271, pulls it off the reel 205. The rotating reel 205 at the same time, and at the same rate of speed, winds up the feed line 251 which would become slack as the back plate 255 on the sliding boom 25 moves toward the reel 205. The rate of winding is such that no slack appears in the feed line 251. Thus the hydraulic lines are always kept relatively taut and never are loose to become entangled.

Figures 11, 12:
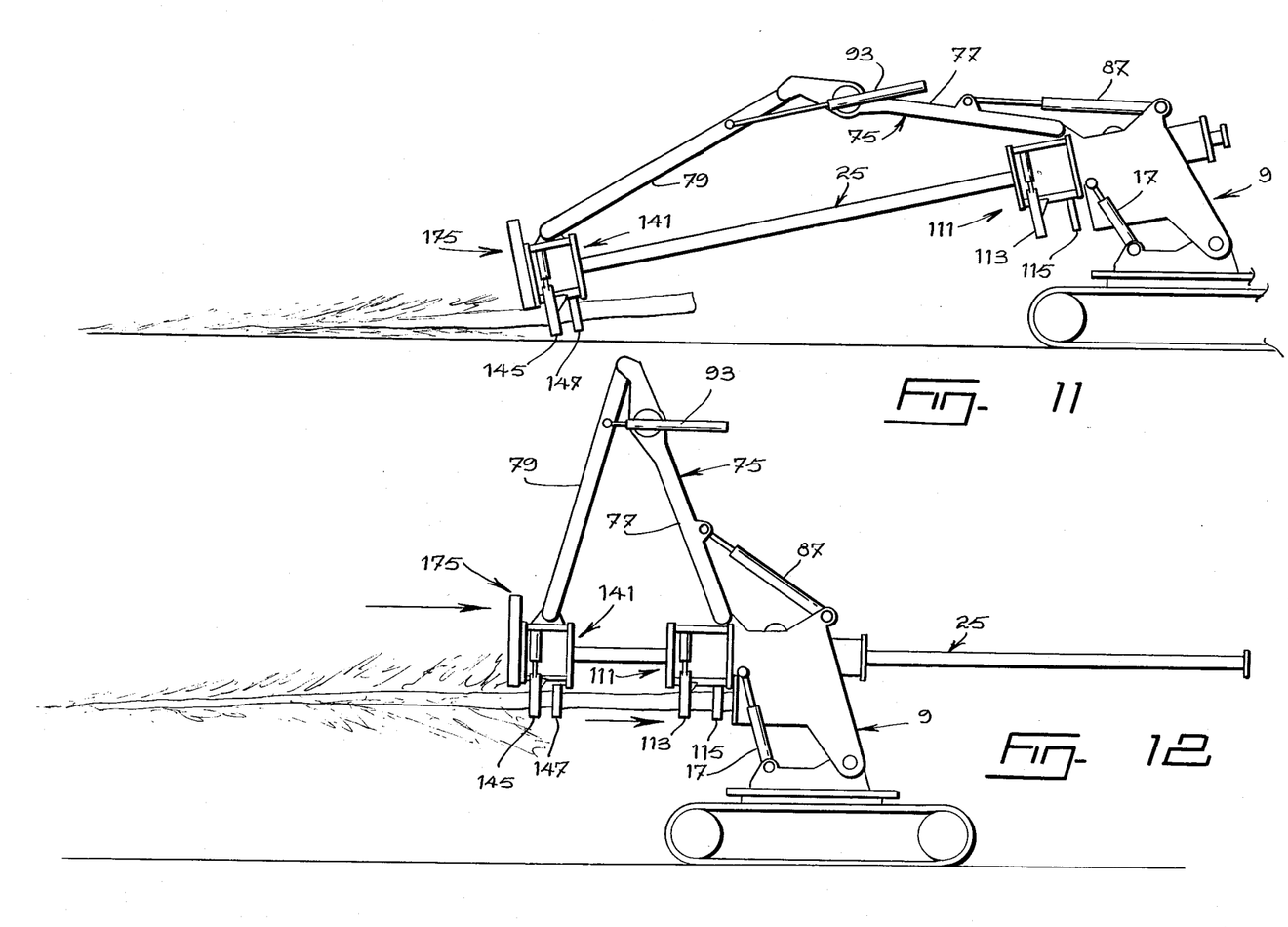

In operation, the delimbing unit 1 is first operated to grasp a tree lying on the ground by its butt end. The actuators 17, connecting the base 9 to the platform 3, are operated to tilt the unit toward the ground, as shown in FIG. 11, and the actuators 87 and 93 are operated to extend the hinged boom 75 thus moving the sliding boom 25 forward to the tree. The delimbing arms 145 and 147 in the delimbing means 141 are operated to pick up the tree. The hinged boom 75 is then retracted causing the slidng boom 25 to move through the base 9 and bringing the delimbing means 141 close to the gripping means 111. At the same time, the actuators 17 are operated to slightly raise the base 9, and thus locate the sliding boom 25 in a generally horizontal position. The butt end of the tree is positioned against the butt surface 133 as shown in FIG. 12 and the gripping arms 113 and 115 are operated by actuators 121 and 123 to securely grip the tree by its butt end. Once the butt end is securely gripped, the delimbing arms 145 and 147 are just slightly released and then the hinged boom 75 is again extended to move the delimbing means 141 forwardly to delimb the tree as shown in FIG. 13. Once the top end of the tree is reached, the cut-off knife 179 is operated to cut off the top end of the tree. The delimbing means 141 can then be moved back to grip the tree at or near its center-of-gravity, the gripping means 111 can be released, and the delimbed tree can be deposited in a storage area by rotating the delimbing unit 1.

Figure 14:
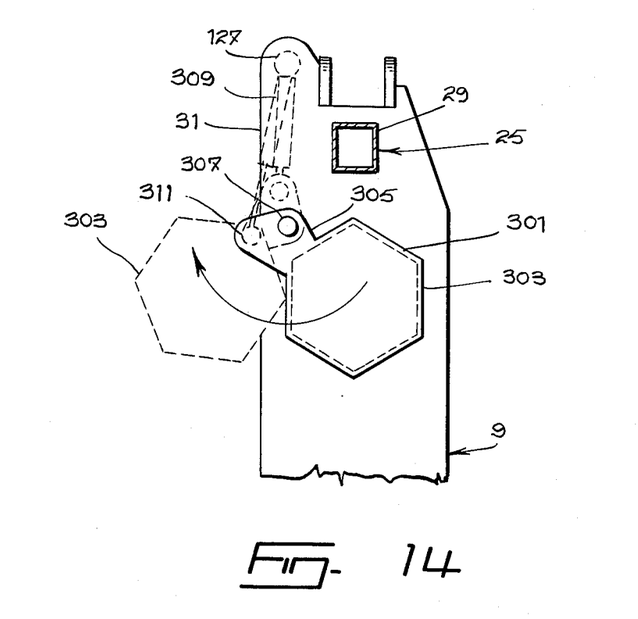
FIG. 14 appearing on the same sheet as FIG. 7, is a cross-section view taken along line 14—14 in FIG. 2.
Figure 15:
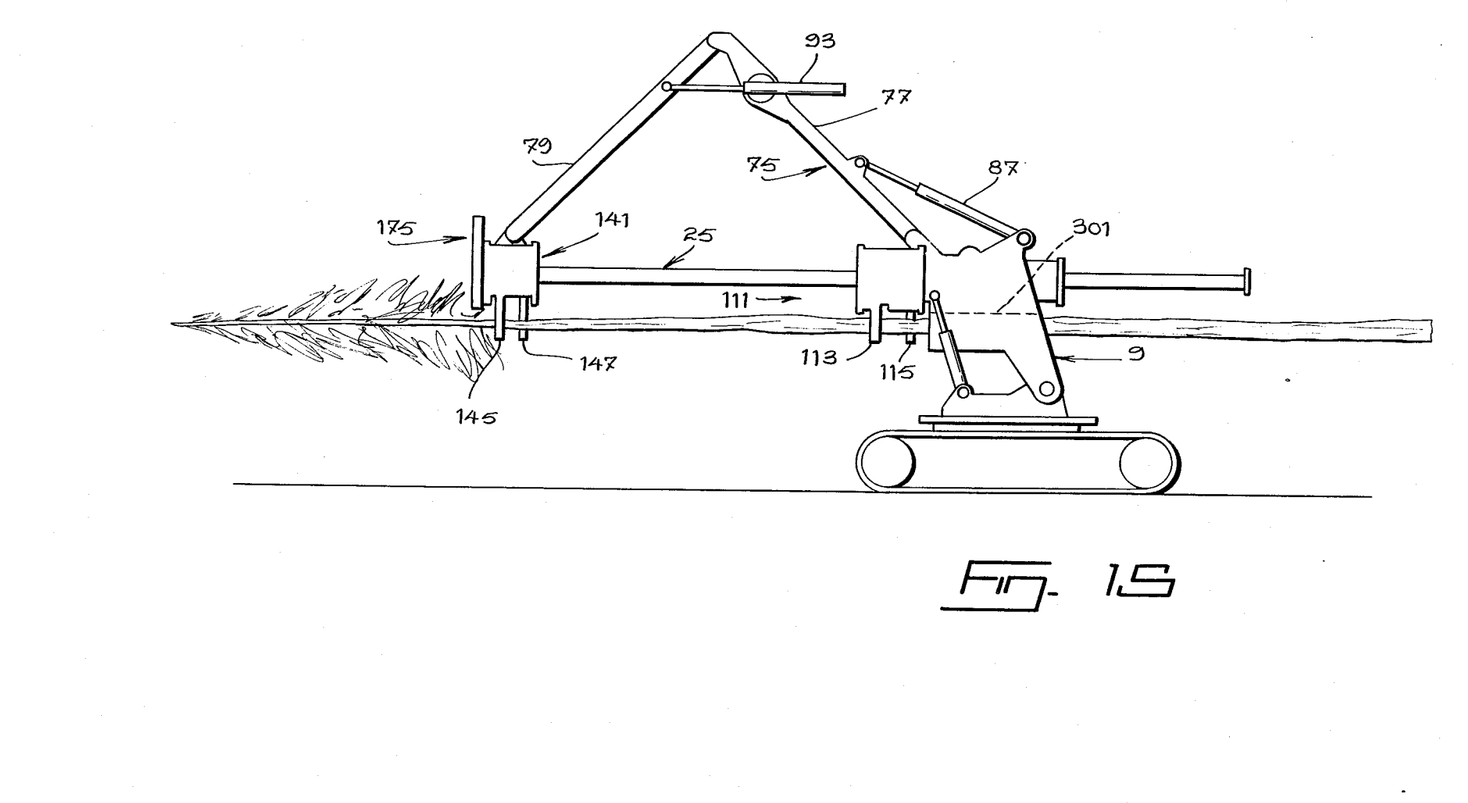
FIG. 15 is a side view of a modified delimbing unit during operation.

The delimbing unit can be modified to accomodate unusually long trees. As shown in FIGS. 2, 6 and 14, the base frame 31 can be provided with a through passageway 301 between its side walls 241, 243. The passageway 301 is generally parallel with the sliding boom 25, and is aligned with the gripping arms 113 and 115. The front end of the passageway 301 is normally closed with a movable butt plate 303. The butt plate 303 has an arm 305 at an outer, upper side. A pivot pin 307 connects the arm 305 to the base frame 31 to swingably connect the butt plate 303 to the base 9. A hydraulic actuator 309 is pivotally connected at one end to an extension of the upper pivot rod 127 on one side of the base 9. The other end of the actuator 309 is pivotally connected to the arm 305 by a pivot pin 311 outwardly of the pivot pin 307 connecting the arm 305 to the base frame 31. Operation of the actuator 309 in one direction will move the butt plate 303 to open the passageway 301 and movement in the other direction will close the passageway 301. Thus a very long tree can be delimbed in two stages. In the first stage, the tree is positioned with its butt against the closed butt plate, gripped, and delimbed part way long its length. The butt plate 303 is then moved to open the passageway 301, the tree is released by the gripping means and moved partway through the passageway by the delimbing means. After the delimbed part of the tree is moved through the passageway, it is again gripped by the gripping means 111 and the remainder of the tree is delimbed as shown in FIG. 15.

Figure 16:
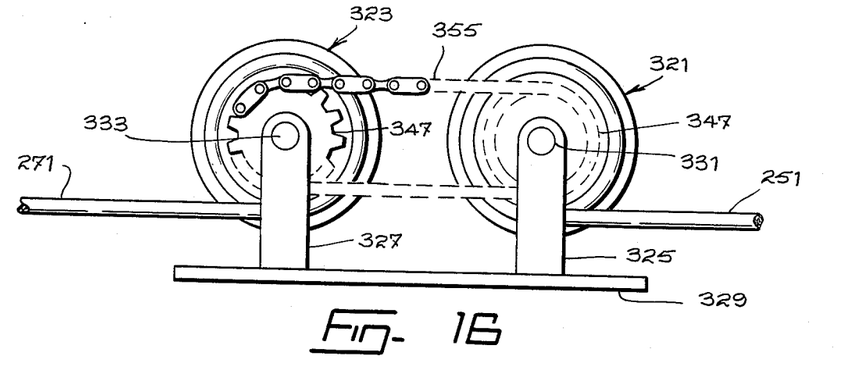
FIG. 16 appearing on the same sheet as FIG. 10, is a side view detail of another embodiment of the hydraulic circuit assembly.
Figure 17:
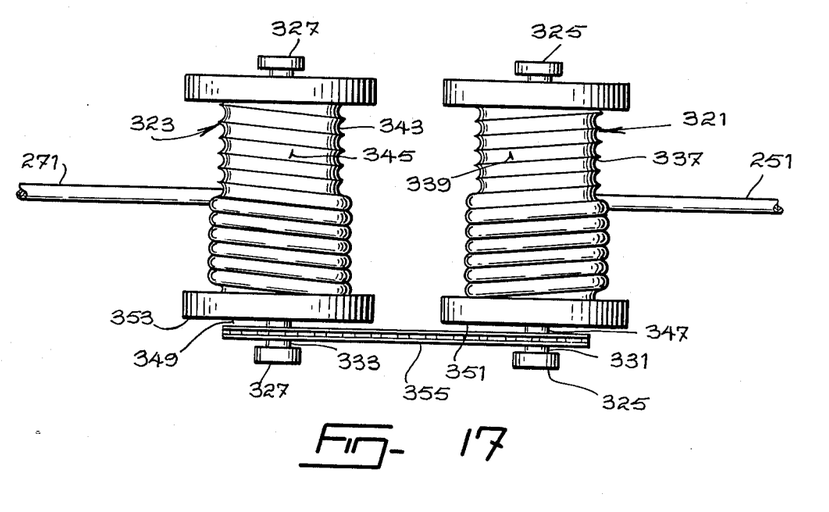
FIG. 17 appearing on the same sheet as FIG. 10, is a top view of the detail shown in FIG. 16.
Figure 18:
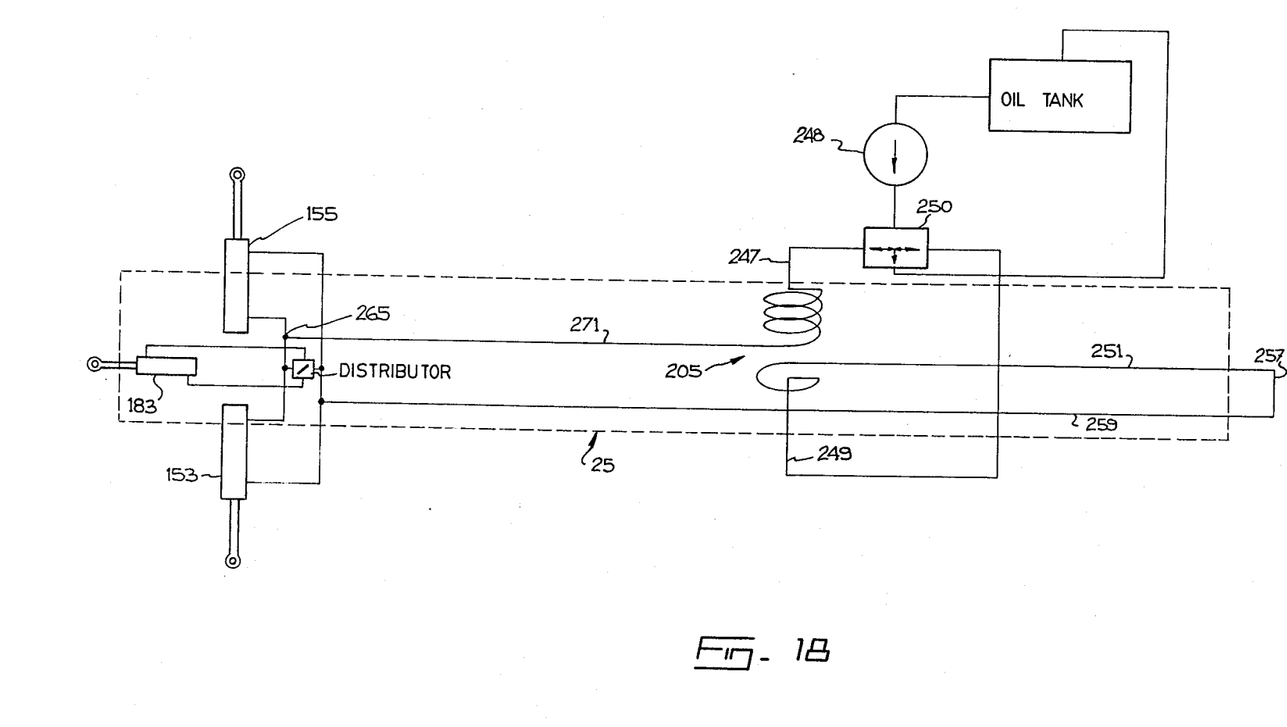
FIG. 18 is a diagrammatic representation of the hydraulic circuit used for operating the delimbing head.
Figure 19:
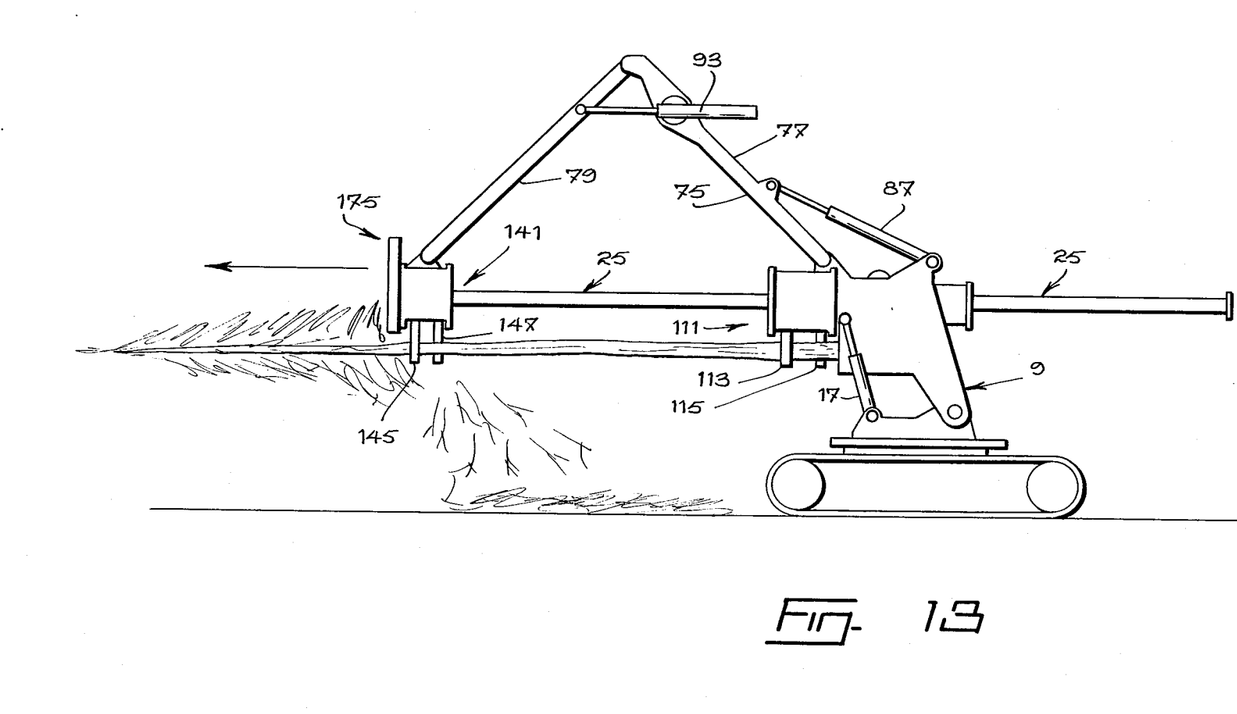

One hydraulic circuit assembly embodiment has been described. An alternative circuit assembly can be used, employing two reels 321 and 323 as shown in FIGS. 16 and 17, instead of one reel. The two reels 321 and 323 are mounted between brackets 325 and 327, respectively, on a mounting plate 329. Each reel 321, 323 is rotatably mounted on a spool 331, 333 respectively. The spools 331 and 333 are fixedly mounted onto the brackets 325 and 327. The spools 331 and 333 are similar to the spool 223 but have only one axial bore, radial section, and encircling groove. The rear most reel 321 is arranged with a left hand helical groove 337 on its outer surface 339. The feed line 251 is connected to a radial bore in the reel at one side similar to the bore 217 in the reel 205, and is partly wound around the reel 321 leaving rearwardly from the bottom of the reel. The radial bore in the reel 321 connects with groove and axial bore in the spool 331.

The front reel 323 is provided with a right hand helical groove 343 on its surface 345. The return line 271 is connected to a radial bore in the reel at one side, again similar to the bore 217 in the reel 205, and is partly wound around the reel 323 leaving forwardly from the bottom of the reel. The radial bore connects with the spool 333. A sprocket 347, 349 is fixes to one side 351, 353 of each reel 321, 323 respectively. A chain 355 is mounted over the sprockets 347 and 349 to have the reels 321 and 323 rotate synchronously in the same direction. As the boom is moved forward, the reel 323 rotates clockwise to unwind return line 271 off its surface 345. Simultaneously, the chain 351 causes the reel 321 to rotate clockwise, winding the feed line 251 up on its surface 339. Thus both reels 321 and 323 operate to keep the feed and return hydraulic lines 251 and 271 taut. The platform 329 is used to mount the reels 321 and 323 on the base 9.

I claim:

1. A boom construction comprising:
   a base;
   a first, straight boom mounted on the base, said first boom having a front end and a rear end;
   guide means on the base for guiding the first boom for sliding movement relative to the base;
   a second, hinged boom having a pair of ends;
   means for pivotally mounting the second boom at one end to the base and at the other end to the front end of the first boom; and
   means for operating the second boom to move its other end toward or away from its one end so as to slide the first boom relative to the base.

2. A tree delimbing unit comprising:
   a base;
   a first, straight boom mounted on the base, said first boom having a front end and a rear end;
   guide means for guiding the first boom for sliding movement relative to the base;
   a second hinged boom having a pair of ends;
   means pivotally mounting the second boom at one end to the base, and at the other end to the front end of the first boom;
   means for operating the second boom to move its other end toward or away from its one end so as to slide the first boom relative to the base;
   means on the base beneath the first boom for gripping a tree to be delimbed; and
   delimbing means mounted on the front end of the first boom for delimbing a tree held by the gripping means when the first boom is slidably moved by the second boom.

3. A tree delimbing unit as claimed in claim 2, further comprising:
   a tree receiving passageway through the base aligned with, and located behind, the gripping means;
   a butt plate mounted on the base; and
   means for moving the butt plate between a first position closing the passageway, and a second position opening the passageway.

4. A tree delimbing unit as claimed in claim 2, wherein the guide means comprise a base frame defining a passageway for the boom;
   spaced-apart pairs of generally horizontal rollers mounted on the base frame above and under the first boom; and
   spaced-apart pairs of generally vertical rollers mounted on the base frame on both sides of the first boom.

5. A tree delimbing unit as claimed in claim 4, wherein means are provided for moving each pair of rollers toward or away from the first boom so as to adjust the position of said rollers relative to the first boom.

6. A tree delimbing unit as claimed in claim 5, wherein each pair of rollers is rotatably mounted in a holding frame, each holding frame being pivotally mounted to the base frame with a mounting pin, and wherein the adjusting means comprises a pair eccentric rings mounted at both ends of the mounting pin, said rings being rotatable relative to the base frame to carry the rollers toward or away from the first boom.

7. A tree delimbing unit as claimed in claim 2, further comprising pivot means for pivotally mounting tthe base on a platform; and
   means for moving the base about its pivot means to tilt the base relative to the platform.

8. A tree delimbing unit as claimed in claim 7, further comprising a hydraulic circuit connecting a source of hydraulic fluid on the base to hydraulic actuators operating the delimbing means on the first boom, said hydraulic circuit including:
   a first flexible line extending along the first boom in one direction from a line handling station;
   a second flexible line extending along the boom in an opposite direction from the line handling station;
   means connecting the first and second lines to the hydraulic actuators;
   means connecting the line handling station to the source;
   said line handling station having rotatable means for maintaining the first and second lines taut as the first boom slides relative to the base.

9. A tree delimbing unit as claimed in claim 8, wherein the rotatable means comprises:
   a single reel rotatably mounted on a spool that is fixedly mounted on the base;
   a fluid connection between the reel and the spool;
   means for connecting the first line to the fluid connection at one side of the reel, said first line leaving the reel in the one direction;
   means for connecting the second line to the fluid connection at the other side of the reel, said second line leaving the reel at the same radial location on the reel as the first line leaves, but in the said opposite direction; and
   means for connecting the spool to the fluid source.

10. A tree delimbing unit as claimed in claim 8, wherein the rotatable means comprises:
    two side-by-side reels, each rotatably mounted on a spool that is fixedly mounted on the base, each spool extending transverse to the boom;
    a fluid connection between each reel and its spool;
    means for connecting the first line to the fluid connection on one reel; said first line being wrapped about the one reel and leaving the one reel in the one direction;
    means for connecting the second line to the fluid connection on the other reel, said second line being wrapped about the reel in the direction opposite to the one direction the first line is wrapped about its reel, and leaving the reel in the said opposite direction to the first line but at the same radial location as the first line leaves its reel;
    means connecting the spools to the fluid source; and
    means connecting the two reels together to rotate synchronously.

11. A tree delimbing unit as claimed in claim 8, further comprising a support cradle extending between the ends of the first boom and located just above the first boom and the base, said support cradle carrying the flexible first and second lines.

12. A hydraulic circuit assembly for a boom construction having a straight rigid boom, a base, means guiding the boom for movement through the base, and means for moving the boom relative to the base, said assembly comprising:

a hydraulic fluid supply on the base;
hydraulically operated means on the boom;
a line handling station on the base;
a first flexible line extending along the boom in one direction from the handling station;
a second flexible line extending along the boom in an opposite direction to the one direction from the handling station;
means connecting the first and second lines to the hydraulically operated means on the bom;
means connecting the handling station to the fluid supply,
said handling station having rotatable means for maintaining the first and second lines taut as the boom moves relative to the base.

13. A hydraulical circuit assembly as claimed in claim 12, wherein the rotatable means comprises:
a single reel rotatably mounted on a spool, said spool being fixedly mounted on the base and extending transverse to the boom;
a fluid connection between the reel and the spool;
means for connecting the first line to the fluid connection at one side of the reel;
means for connecting the second line to the fluid connection at the other side of the reel, the second line leaving the reel at the same radial location on the reel as the first line leaves; and
means for connecting the spool to the fluid supply.

14. A hydraulic circuit assembly as claimed in claim 12 wherein the rotatable means comprises:
two side-by-side reels, each rotatably mounted on a spool that is fixedly mounted on the base, each spool extending transverse to the boom;
a fluid connection between each reel and its spool;
means for connecting the first line to the fluid connection on one reel, said first line being wrapped about the one reel and leaving the one reel in the one direction;
means for connecting the second line to the fluid connection on the other reel, said second line being wrapped about the reel in the direction opposite to the one direction the first line is wrapped about its reel, and leaving the reel in the said opposite direction to the first line but at the same radial location as the first line leaves its reel;
means connecting the spools to the fluid source; and
means connecting the two reels together to rotate synchronously.

15. A hydraulic circuit assembly as claimed in claim 12, wherein said means connecting the first line to the hydraulically operated means on the boom include a section of line running through the boom.

16. A hydraulic circuit assembly as claimed in claim 12, further comprising a support cradle extending between the ends of the boom, said support cradle being located just above the boom and supporting the first and second flexible lines from the rotatable means to the ends of the boom.

* * * * *